United States Patent [19]

Roberts

[11] 3,995,428
[45] Dec. 7, 1976

[54] WASTE HEAT RECOVERY SYSTEM

[76] Inventor: Edward S. Roberts, 214-05 33rd Ave., Bayside, N.Y. 11361

[22] Filed: Apr. 24, 1975

[21] Appl. No.: 571,212

[52] U.S. Cl. .................................. 60/641; 60/645; 60/649; 60/655; 60/670; 60/715
[51] Int. Cl.² .......................................... F03G 7/00
[58] Field of Search ............ 60/673, 649, 677, 678, 60/679, 641, 645, 651, 655, 670, 671, 715

[56] References Cited
UNITED STATES PATENTS

| | | | |
|---|---|---|---|
| 1,230,417 | 6/1917 | Lillie ................................... | 60/649 |
| 1,250,087 | 12/1917 | Bradley ........................... | 60/673 X |
| 2,151,949 | 3/1939 | Turner ................................. | 60/649 |
| 2,215,497 | 9/1940 | Doczekal ......................... | 60/649 X |
| 3,358,451 | 12/1967 | Feldman et al. ................. | 60/671 X |
| 3,879,949 | 4/1975 | Hays et al. ............................ | 60/649 |

*Primary Examiner*—Martin P. Schwadron
*Assistant Examiner*—H. Burks, Sr.
*Attorney, Agent, or Firm*—Robert Ames Norton; Saul Leitner

[57] ABSTRACT

Waste heat in the form of the sensible heat of flue gases, sensible and latent heat of geothermal sources, etc., is converted to usable energy. When the energy source consists solely of sensible heat of a gas or a liquid which is not the working fluid, the liquid working fluid is heated by the energy source and then expanded in a hot liquid turbine wherein partial vaporization occurs with decrease in pressure. The working fluid is thereby accelerated as thermal energy is converted to kinetic energy and internal energy of the vapor. The hot liquid turbine can be a hot liquid impulse turbine wherein the expansion occurs in the inlet nozzles and the mixed phase working fluid then impinges on the moving buckets of the impulse turbine transferring the kinetic energy to shaft work. Within each impulse turbine casing the working fluid, at greatly reduced velocity, undergoes phase separation, the vapor going to a vapor turbine for expansion and the liquid going to a following stage of nozzle expansion in an impulse turbine to a final stage of condensation and liquid recycle. Each of a sequence of expansion stages includes a pairing of impulse turbine expansion and vapor turbine expansion both within the same limits of pressure. The first stage of the sequence need not include a vapor expander when the energy source includes only sensible heat. When the energy source is one which requires recovery over a temperature range such that multiple working fluids are used to advantage the latent heat in the combined vapors of the final stage expansion of one working fluid is utilized to evaporate an equivalent amount of the second working fluid. The vapor so generated is then expanded in a vapor turbine paired if need be with impulse turbine expansion in the first expansion stage of the second working fluid. Liquid for expansion in this stage is brought to saturation temperature by heat exchanged from the energy source. Water is a preferred working fluid within the temperature range of 66° to 260° C. and may be used from ambient to its critical temperature. A working fluid of lower volatility is preferred for stages at higher temperature and a more volatile working fluid for the stages at lower temperature. Vapor from the lowest temperature stage is condensed by exchange with a heat sink and all condensate from the final stage of each working fluid is recycled in heat exchange with the energy source. In energy recovery from a geothermal source the energy source may be the working fluid, as hot water, for expansion in the first stage impulse turbine or, as vapor, for the first stage vapor turbine. If the geothermal source is not suitable as a working fluid, the energy may be recovered from the hot liquid by heat exchange with pressurized liquid working fluid.

10 Claims, 4 Drawing Figures

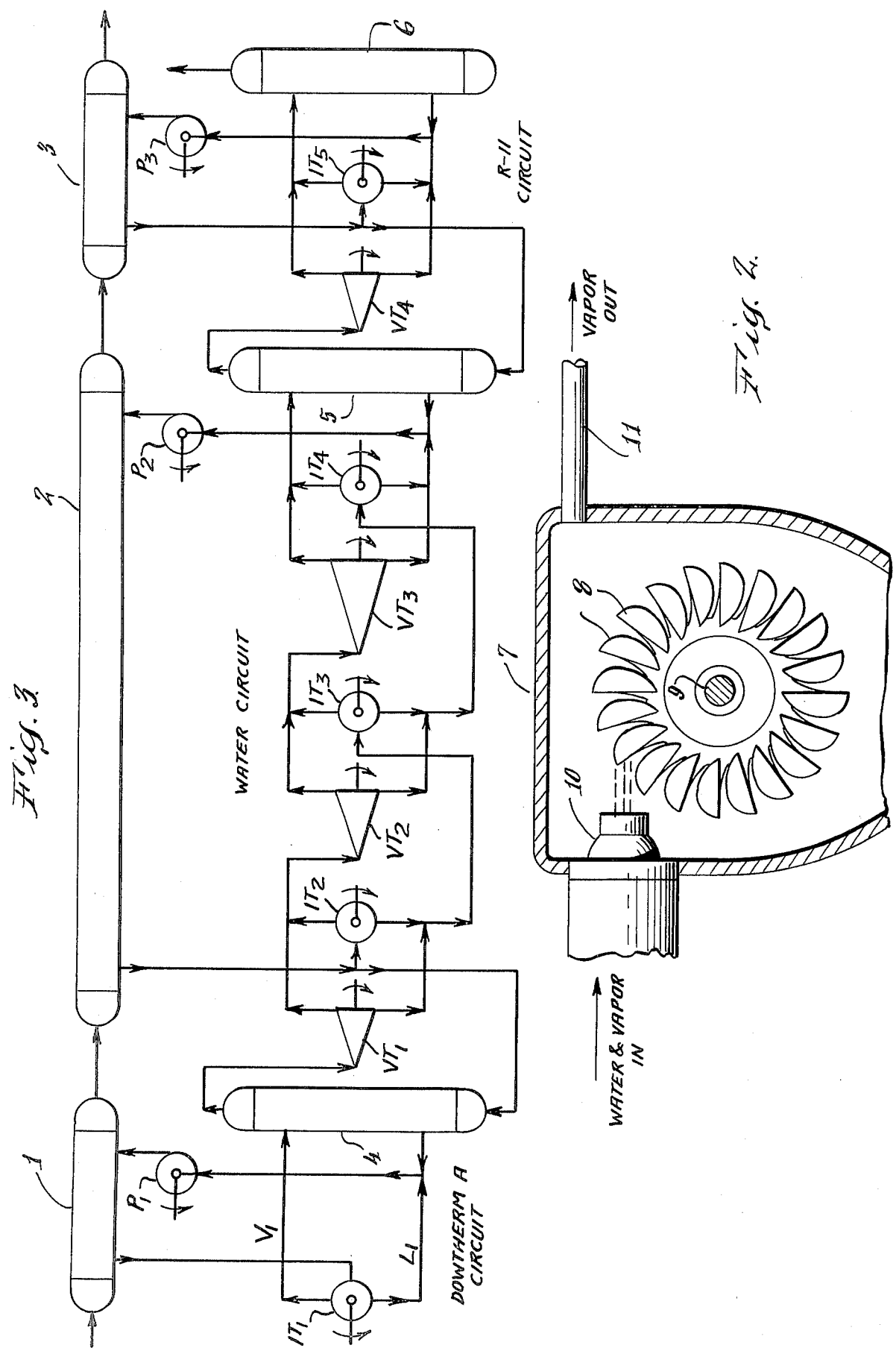

WASTE HEAT RECOVERY SYSTEM

BACKGROUND OF THE INVENTION

The problem of waste heat recovery, i.e. transformation into power, is an important factor with various geothermal heat sources. Only a few, such as located at Larderello in Italy, the geysers in California, and certain artificial wells in which water is injected in hot rock, are at sufficiently high temperature to produce steam which is dry and at a temperature and pressure suitable for direct use in steam turbines. In many other localities, hot water or hot water and steam are produced.

Other sources of waste heat include flue gases from power plants and incinerators and process gases of chemical and metallurgical operations. Waste heat boilers have been used for energy recovery from these sources. Heat is transferred from the source to the working fluid in the boiler, causing evaporation and producing steam which is expanded to generate shaft energy. In this method very little energy is recoverable below the temperature of the boiler (in economizers) and very little is recoverable at a level of temperature significantly above the boiler temperature (superheaters and reheaters). Thus a major part of the thermal energy is either lost or degrades so that the efficiency of conversion to shaft work is low.

To overcome this deficiency a multiplicity of waste heat boilers may be employed to utilize the thermal energy at more than one level of temperature to reduce the loss and/or degradation. It has also been proposed in a series of patents to Turner, of which U.S. Pat. No. 2,151,949 is typical, to utilize the sensible heat of pressurized water by converting this into kinetic energy which is utilized in impingement on the moving buckets of an impulse turbine producing shaft energy.

In Turner the heated pressurized water is expanded by reducing the pressure to cause a fractional adiabatic self-evaporation. This results in an acceleration of the mixture of vapor and liquid. Streams of the two-phase working fluid pass through nozzles and impinge on the buckets of the turbine. Other similar proposals have been made, e.g., in an article of Basil Wood, UNESCO Earth Sciences, Vol. 12, p. 118, relating to geothermal energy.

The present invention deals with an improved process and system in which waste heat is transferred or is present in a pressurized working fluid which is expanded in multiple stages to achieve a highly efficient conversion to shaft work.

SUMMARY OF THE INVENTION

The first aspect of this invention is the transfer of sensible heat from a waste heat source which is not suitable for use as a working fluid to a working fluid in the form of a pressurized liquid. This transfer is preferably countercurrent in heat exchangers using a proportion of the working fluid such that it is heated to the maximum temperature which is consistent with maximum recovery of the heat from the source. If the heat source is a stream of hot gas it is unsuitable as a working fluid. Also in some instance geothermal water may contain such amounts of dissolved substances that it would be preferable to remove the heat from it in heat exchange with a separate working fluid.

The second aspect of this invention involves multiple stage expansion of the working fluid. In the event that the working fluid entering the system is entirely in the liquid state, the first stage of expansion is through a hot liquid turbine, for example an impulse turbine. Vapor and liquid leave this hot liquid turbine in separate streams. The liquid stream is sent to a second stage hot liquid turbine in which it is expanded to the second stage discharge pressure. The vapor stream from the first stage hot liquid turbine is expanded in a vapor turbine to the second stage discharge pressure. The vapor from the second stage hot liquid turbine joins the vapor from the second stage vapor turbine and is sent to the third stage vapor turbine. The liquid from the second stage hot liquid turbine joins the liquid separated from the vapor leaving the second stage vapor turbine and is sent to the third stage hot liquid turbine. If further staging is required then each additional stage is paired and consists of a vapor turbine paired with a hot liquid turbine.

The importance of staging is illustrated by assuming that the hot liquid turbine is an impulse turbine in which the entering hot liquid is expanded in stationary nozzles so designed as to efficiently convert the potential and heat energy of the inlet hot liquid into kinetic energy of jets of mixed liquid and vapor issuing from the nozzles. The kinetic energy in these jets is converted into mechanical energy by allowing the jets to impinge on moving buckets or blades attached to the rotor of the turbine. For efficient conversion of kinetic energy in the jets to mechanical shaft energy at the turbine, the jet velocity should be about twice the bucket velocity of the rotor. The maximum bucket speed is determined by the material and design limitations which thus limit the jet velocities.

The jet velocities are determined by the inlet enthalpy of the liquid and the enthalpies of the outlet liquid and vapor. As an illustration, assume that the hot liquid entering the nozzles is water saturated at 254° C. and that, after expansion through the nozzles, the water is saturated at 204° C. Assuming isentropic expansion that will be quite closely approached in a properly designed nozzle, the difference between the enthalpy of 0.454 kg. of inlet water at 254° C. and the enthalpies of the outlet liquid and vapor at 204° C. is 1.58 kilo calories. The conversion of this energy to kinetic energy results in the evaporation of about 11.5% of the water and a jet velocity of 171 m/sec., a speed that is within the limits of conventional design. If, on the other hand, the expansion were from saturated water at 254° C. to 105° C., the fraction of water evaporated is 25% and the jet velocity is 473 m/sec., which is excessive.

In addition to the problem of high jet velocities encountered when staging is not done, it must be noted that greater evaporation occurs and this produces larger jet diameters and larger equipment to convert efficiently the kinetic energy to mechanical energy.

The jet velocity is determined by the kinetic energy per unit mass of working fluid, which is determined in turn by the thermal energy given up by the working fluid at each stage. This determines the stage temperatures and pressures. It is desirable to recover the maximum energy at each stage which is consistent with these limitations. Without intending to limit the invention or to base it on a fixed numerical limit, the jet speeds are maintained in each stage below about 275 to 300 m/sec. In each stage the full practical impulse turbine efficiency is realized.

Liquid and vapor are separated in the turbine housing in each stage and, until the last stage of the sequence, each phase from one stage is further expanded in a following stage, the liquid in an impulse turbine and the vapor in a vapor turbine. Thus it is characteristic of the present invention that each stage consists of a parallel expansion of liquid and vapor. The vapor entering each, except the first stage is obtained from vapor from the impulse turbine and the vapor turbine of the previous stage. The total amount of working fluid is the same at each stage but the mass of vapor increases stagewise and the mass of liquid decreases. Of course, the volume of the vapor increases even more than the mass.

The first stage receives pressurized liquid working fluid to be expanded in an impulse turbine and it may receive vapor to be expanded in a vapor turbine. Saturated liquid is obtained from the heat source as described above. In the recovery of energy from geothermal sources it may be geothermal water or pressurized water which is heated thereby. The first stage may also receive vapor from geothermal sources or by evaporation of water in heat exchange with vapor from geothermal sources. Geothermal liquid and vapor are used directly when possible but are used indirectly through heat exchange when they are scale forming, erosive, or corrosive.

In the final stage of expansion of a working fluid according to this invention, the vapors from both the impulse turbine and from the vapor turbine are condensed. Condensate of both vapors together with liquid from the impulse turbine are recycled for heat recovery from the energy source. Condensation is by heat exchange with a heat sink or, in an embodiment using multiple working fluids, as described below, by heat exchange of condensing vapor of a first, higher boiling fluid to an evaporating liquid of a second, lower boiling working fluid.

Water is a preferred working fluid except at the higher pressures at which the pressure for containment of liquid water may be excessive. It is then advantageous to use a less volatile liquid, for example diphenyl or diphenyl ether, sold in the trade under the name "Dowtherm," for the highest temperature stages. In the lowest temperature stages water, as a working fluid, possesses the disadvantage of very low vapor density and consequently large volume flow rates requiring large impulse and vapor turbines. Therefore, if the recovery of waste heat is required over a wide temperature range, a third aspect of this invention is to employ a system of multiple working fluids, each working fluid providing the most advantageous conditions at each level of temperature.

Each working fluid recovers sensible heat from the heat source over the temperature range in which it functions. There may be one or more stages of expansion for each working fluid including an impulse turbine and a vapor turbine for each stage except that in the final stage (or only stage) of each working fluid the vapor is condensed, the enthalpy of condensation serving to evaporate an equivalent amount of the following working fluid in a condenser/evaporator or, in the lowest temperature stage, the enthalpy of condensation is absorbed by ambient air or water in a condenser.

It is a preferred modification of the present invention to operate the low pressure, or at least the portion of the heat recovery system that would be subatmospheric if water were used, with a low boiling working fluid. A typical low boiling working fluid is a fluorocarbon, for example the readily commercially available refrigerant R-11, which is principally trichlorofluoromethane. This liquid has a lower boiling point and so the exhaust steam from the last combined impulse turbine steam separator of the water circuit can be efficiently used to heat and evaporate the low boiling liquid, which for simplicity will be referred to from here on by its preferred type R-11, the very large latent heat of the exhaust steam from the last steam turbine and separated from the last impulse turbine stage of the water circuit can be very effectively used and can be at a somewhat higher pressure than atmospheric. R-11 has a critical pressure of around 45 kg/cm$^2$ at about 198° C. As a practical matter, of course, somewhat lower temperatures and pressures are used but still they are very much higher than corresponding to some sub-atmosphericj pressures for turbines using steam, and this implies sub-atmospheric vapor volumes. This makes possible operating down to about ambient temperature with considerably smaller equipment, such as vapor turbines and impulse turbines. Since the changeover temperature from the water circuit to the R-11 circuit is not critical, the best temperature can be chosen which optimizes refrigerant versus water equipment.

In the impulse turbine the working fluid, whether water, higher boiling liquid or lower boiling refrigerant, is admitted to the nozzles of the impulse turbine as a saturated liquid. The nozzle design provides for a partial evaporation as the static pressure is reduced within the nozzle. This is accompanied by expansion and acceleration of the mixed phase working fluid, whereupon the enthalpy is reduced as an equivalent of kinetic energy is developed.

This kinetic energy is retained by the mixed phase working fluid as it leaves the nozzles until it impinges on the moving buckets or blades as described above. Except for this modification of nozzle design and provision of buckets sized to accommodate the flow volume of the expanded working fluid, both impulse and vapor turbines may be of standard design, a large practical advantage of this invention. The invention is, therefore, principally a process invention, although the organization of equipment is also included in a more limited apparatus feature.

BRIEF DESCRIPTION OF THE DRAWINGS

FIG. 2 is a vertical cross-section through a typical impulse turbine;

FIG. 3 is a diagrammatic showing of a three-fluid system, a high boiling organic fluid, such as Dowtherm, water, and R-11.

DESCRIPTION OF THE PREFERRED EMBODIMENTS

While the drawings are diagrammatic, the vapor turbines are shown as somewhat increasing in size as the pressure of the vapor handled decreases. The impulse turbines are shown as circles but no effort is made to indicate any change in turbine dimensions. Of course, there will be some change as the turbines are designed for best results under the particular temperatures and pressures.

EXAMPLE 1

Figure 1:
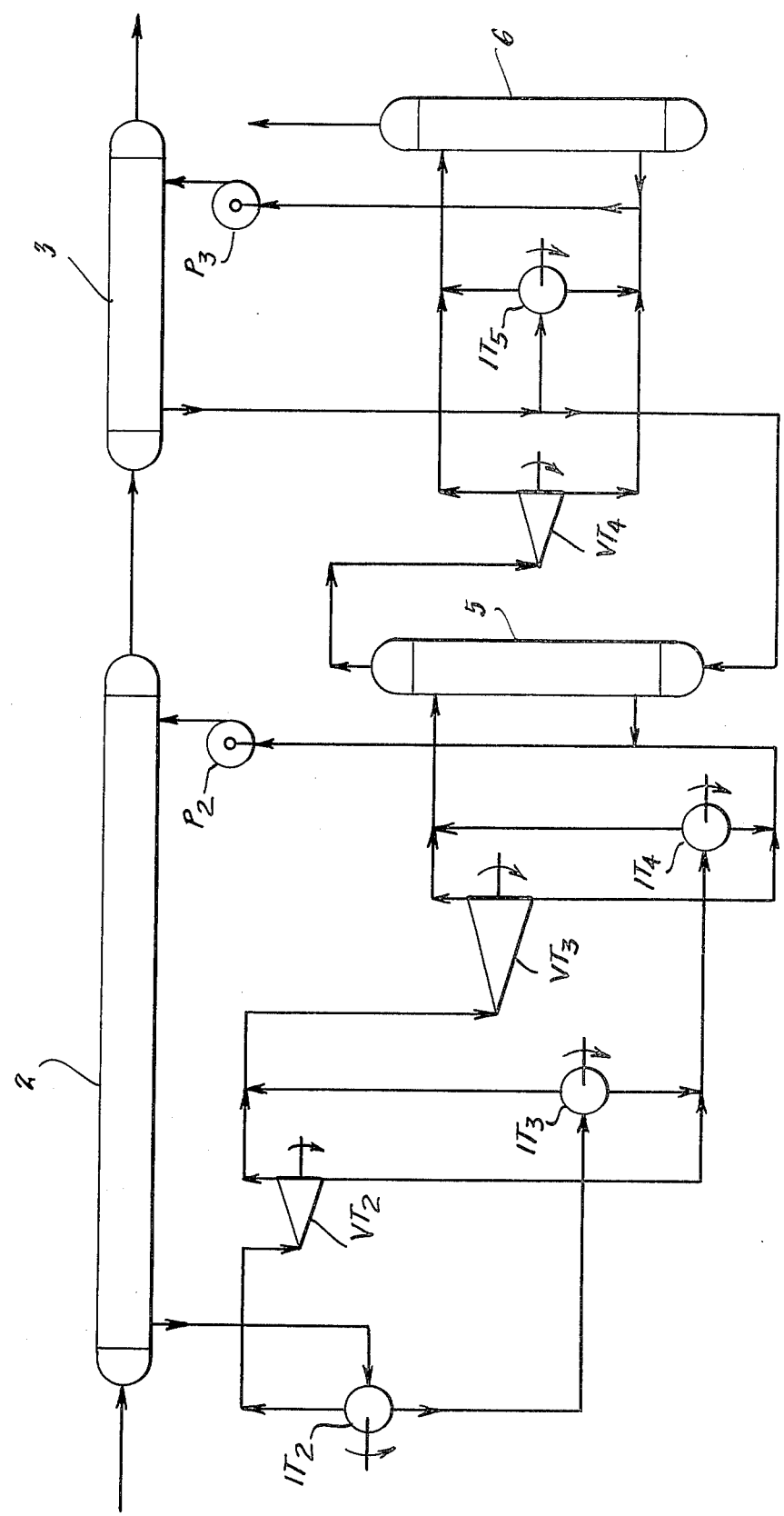
FIG. 1 is a diagrammatic flow sheet for a system using two fluids, water and chlorofluorocarbon, R-11.

This example refers to a two-liquid system, shown in FIG. 1. In both FIGS. 1 and 3 a series of impulse turbines, diagrammatically represented by circles, are numbered IT-2 to IT-5 in FIG. 1 and with an additional section in FIG. 3 the corresponding impulse turbine is IT-1.

In FIG. 2 is shown in cross-section a typical impulse turbine with a housing 7, buckets 8, shaft 9, nozzle 10, and vapor outlet 11. In FIGS. 1 and 3, in order not to confuse the drawings the impulse turbines are represented by circles. FIG. 2 illustrates one typical impulse turbine, which is of conventional design except that it is modified by having a vapor outlet 11 because in the present invention each impulse turbine performs two functions, generating power and separating the portion of the fluids coming out of the nozzle 10 into vapor and liquid. After passing around the portion of the periphery, the liquid is discharged, which would be from the bottom, shown broken away. A specific discharge conduit is not shown as this is conventional. In FIGS. 1 and 3 the outflow of liquid is shown by a line from the bottom of the circle, the vapor which separates in the turbine housing being shown by a line from the top of the circle. This vapor outlet, of course, corresponds to conduit 11 in FIG. 2.

As the present invention is a waste heat recovery system regardless of whether the waste heat comes in the form of hot gases or hot liquid, in FIGS. 1 and 3 this is shown going through heat exchangers 2 and 3 in FIG. 1 and 1, 2 and 3 in FIG. 3. The heat exchangers are semi-diagrammatic, being of the general shape externally of a conventional shell and the tube heat exchanger. By using heat exchangers to transfer heat to the working fluid, it makes no difference whether this heat comes from gases or from liquids and also makes little or no difference whether the liquid contains somewhat corrosive contaminants.

Example 1 refers to a system of two working fluids, water and R-11. This example is illustrated on FIG. 1 of the drawings. The energy source consists of 272,000 kg/hr. of hot water at 260° C. and 59.1 kg/cm². Energy is recovered in two heat exchangers, 2 with a duty of 43.18 × 10⁶ kilo calories/hr. and 3 with a duty of 15.15 × 10⁶ kilo calories/hr. The energy source leaves 2 at 116° C. and 3 at 60° C. with a minor pressure drop in each exchanger. In 2 the enthalpy exchange is to water which, at 43.5 kg/cm², enters at 105° C. and leaves at 254° C. In 3 the exchange is to R-11, which, at 9.12 kg/cm², enters at 50° C. and leaves at 105° C.

The first expansion stage in the water system is in the hot liquid turbine IT-2 with no paired vapor turbine. In order to avoid possible confusion, the impulse turbines are referred to as IT with a number and the vapor turbines as VT with a number. Assuming 85% efficiency, this turbine generates 939.55 kw. by expansion to 17.31 kg/cm². At this pressure both liquid and vapor are at 204° C. Vapor turbine VT-2 operating at 70% efficiency generating 1315.87 kw and hot liquid turbine IT-3 at 85% efficiency producing 762.26 kw together constitute the second stage expansion. The vapor turbine VT-2 receives the vapor from IT-2 and IT-3 receives the liquid.

The third expansion stage includes vapor turbine VT-3 generating 2714.54 kw, again at 70% efficiency, and impulse hot liquid turbine IT-4 generating at 695.54 kw at 85% efficiency. Both liquid and vapor are delivered at the saturation temperature and pressure of 154° C. and 5.44 kg/cm² and the vapor to VT-3 is combined vapor from VT-2 and IT-3.

Liquid from VT-3 and vapor from VT-3 and IT-4 are discharged at the saturation temperature and pressure of 104° C. and 1.2 kg/cm². The vapor at the rate of 70856 kg/hr. is condensed in condenser 5 producing condensate which, with liquid from IT-4, is repressurized to 43.5 kg/cm² and recycled through 2 by means of pump P-2, which requires 507.25 kw at 65% efficiency.

The heat transfer duty in 3 is performed with 1264525 kg/hr. of R-11 at 45° C. entering at 50° C. and leaving at 104° C. The heat transfer duty in 5 of 38 × 10⁶ kilo calories/hr. requires evaporation of 1098055 kg/hr of R-11. This vapor and 1.66 × 10⁵ kg/hr. of liquid, both at 104° C. and 9.12 kg/cm² are expanded in a single stage in vapor turbine VT-4 for the vapor and hot liquid turbine IT-5 for the liquid. Both expand to 50° C. and 2.31 kg/cm². VT-4 generates 5494.0 kw at 70% efficiency and IT-5 generates 174.17 kw at 85% efficiency. Vapor from both turbines is condensed in 6 with a duty of 49 × 10⁶ kilo calories/hr. using ambient coolant. The condensate and liquid from IT-5 are repressurized to 9.12 kg/cm² and recycled by pump P-3, which requires 255.98 kw at 65% efficiency.

The total power output of the turbines less the pump input for the water system is 5920 kw and for the R-11system is 5410 kw, making a total net output of 11330 kw. If power were reversibly recovered from 2.72 × 10⁵ kg/hr. of hot water cooled from 259° C. to 50° C. during power production at 100% efficiency, then 15727 kw would be produced. Using Carnot's cycle integrated over the temperature range, assuming constant specific heat, 15453 kw would be produced. On the first mentioned basis, the suggested system recovers 72% of reversibly recoverable energy, and on the basis of Carnot's cycle, 73.3%.

EXAMPLE 2

FIG. 3 represents a system which incorporates all the features of FIG. 1 but in addition has a third circuit using a third fluid. For convenience the numbering of the two kinds of turbines is the same in both figures. Also, FIG. 3 is diagrammatic just as FIG. 1 was.

In FIG. 3 there is a circuit using a higher boiling liquid, labeled for a typical illustration Dowtherm A circuit. The first heat exchanger is labeled 1 and is in series with heat exchangers 2 and 3, which have been described in conjunction with FIG. 1. In the circuit the liquid is circulated through heat exchanger 1 by the pump P-1, enters the hot liquid turbine IT-1, where the enthalpy in the liquid is converted to shaft energy, just as was the case in the water and R-11 circuits of FIG. 1. Liquid discharge is recycled, as in the case of the water and R-11 circuits, and the vapor which is separated in the turbine IT-1 is condensed in the condenser 4, where it is cooled by evaporation of water into steam, which passes through the steam turbine VT-1. From this point on the operation is shown in FIG. 1 and has been described therein. Since this portion of FIG. 3 does not differ from FIG. 1, the description of the latter figure is not repeated.

EXAMPLE 3

Figure 4:
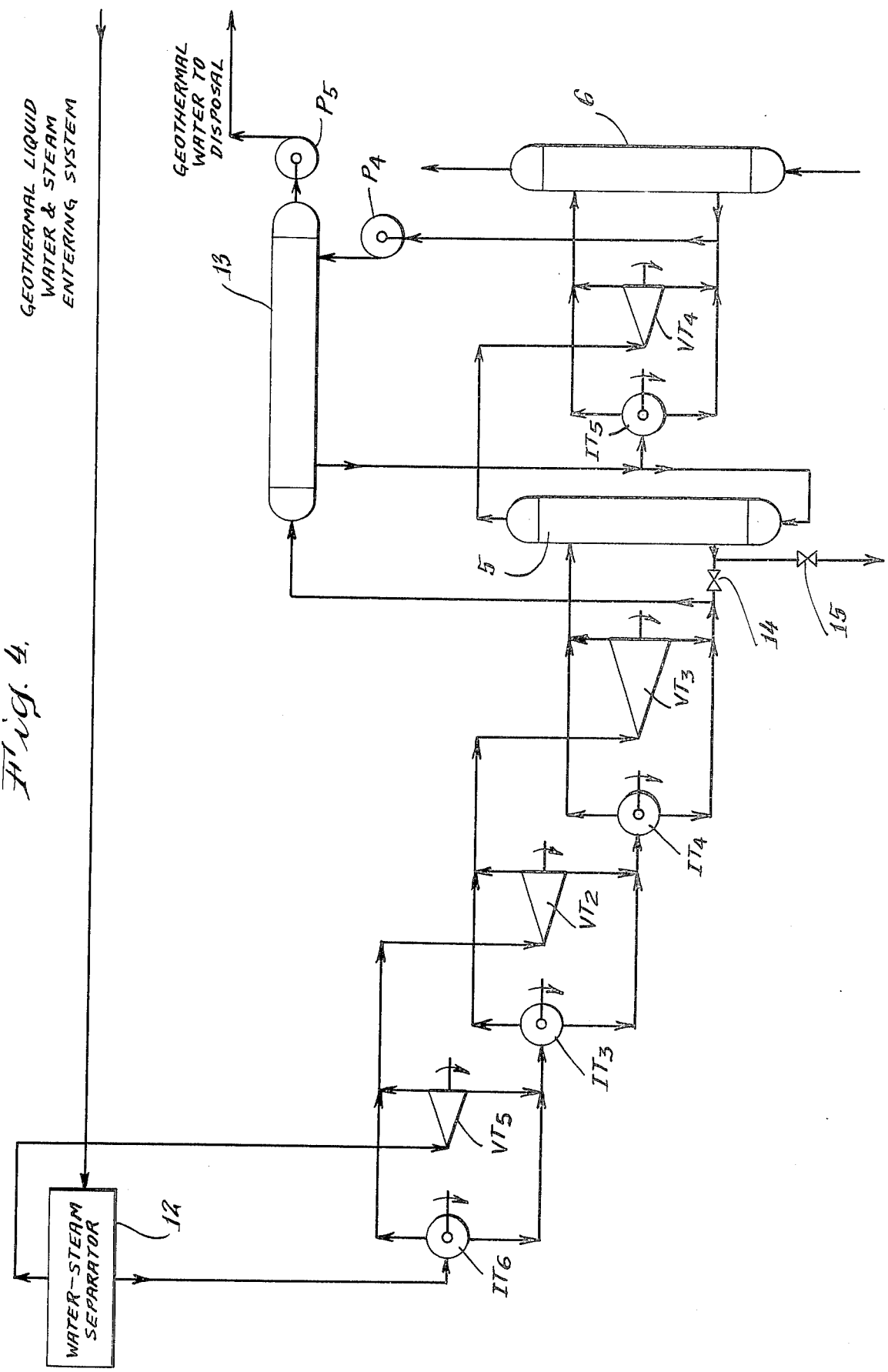
FIG. 4 is a diagrammatic showing similar to FIG. 1 but for direct use of geothermal water-steam mixture.

FIG. 4 illustrates a two-liquid system in many respects similar to that illustrated in FIG. 1 where elements such as turbines, heat exchangers and the like are performing the same functions as in FIG. 1. They are given the same reference numerals.

The modification in FIG. 4 takes a geothermal liquid, water and steam, which passes to water-steam separator 12. The hot water passes through the impulse turbine IT-6 whereas the steam from the separator 12 passes through the steam turbine VT-5. Steam separated in IT-6 and exhaust steam from the turbine VT-5 then pass to steam turbine VT-2. While the VT-5 goes directly into VT-2, which is a little different from the arrangement in FIG. 1, the water from turbine IT-6 and condensate from the turbine VT-5 pass into turbine IT-3, where water and steam are separated, the steam going to steam turbine VT-3 and the water, with condensate from steam turbine VT-2, goes to liquid turbine IT-4. This is essentially the same arrangement as in FIG. 1. Exhaust steam from VT-3, water from IT-4, and condensate from VT-3 join and pass through the heat exchanger 13, from which they are pumped out to geothermal water disposal by the pump P-5. Exhaust steam from turbine VT-3 enters the heat exchanger 5 where it evaporates R-11. This is essentially similar to FIG. 1 except that the condensate instead of being pumped back to a heat exchanger 2 passes through the heat exchanger 13 with an optional drainage controlled by the valves 14 and 15, which permit the condensate to pass either through the heat exchanger 13 or some or all of it may be drained.

R-11 is pumped by the pump P-4 through the heat exchanger 13 where the pressure is maintained sufficiently high so that it does not boil. This is essentially what is done in FIG. 4 by heat exchanger 3. The pressurized R-11 passes into the liquid turbine IT-5, as is the case with the circuit shown in FIG. 1. Also, a portion of this liquid R-11 passes through a heat exchanger 5. The vapors from heat exchanger 5 pass through the vapor turbine VT-4 and exhaust vapors, including the vapor from IT-4, are passed into the condenser 6 where they are condensed by ambient coolant, as in FIG. 1. The condensed R-11, which is a liquid, and the exhaust liquid from turbine IT-5 and condensate for turbine VT-4 join the condensed liquid from the condenser 6 and are pumped through the heat exchanger 13, as has been described. This part of the circuit is identical with that of FIG. 1 except that the heat exchanger 13 is receiving waste geothermal water instead of partially cooled fluid from the waste heat source as in FIG. 1 in heat exchanger 3. While the pump P-4 is performing the same function as pump P-3 in FIG. 1, it has been given a separate number because it pumps through a different kind of heat exchanger 13.

It will be seen that the geothermal heat source is separated in the separator 12 and forms the working fluid of the water circuit in FIG. 4. As has been described in an ealier part of the specification, this modification is practical only where there is not an excessive amount of corrosive constituents in the geothermal water and steam. Where there are excessive amounts of corrosive material which would damage rapidly rotating machinery, such as the impulse turbines and steam turbines, this geothermal water and/or steam may be used as a waste heat source in the modification shown in FIG. 1 where they heat up water and R-11 by indirect heat exchage and do not themselves form any part of the working fluid. Where, of course, the geothermal water and stream are of suitable composition, it is simpler to use them in the circuit of FIG. 4, and where this is the case this constitutes the preferred circuit and arrangement of equipment.

I claim:

1. A process of heat recovery and energy production which comprises multistage expansion of a working fluid, in at least one stage of which saturated liquid is expanded to a two-phase mixture in a hot liquid turbine with parallel vapor expansion in a vapor expander, the expansion in said hot liquid turbine between substantially the same limits of temperature and pressure as in the expansion in said vapor turbine.

2. A process according to claim 1 in which expanded working fluid from the hot liquid turbine is separated into component vapor and liquid phases and vapor phase from the hot liquid turbine combined with vapor from the vapor turbine is expanded in a second vapor turbine with parallel expansion of the liquid from the hot liquid tursbine in a second hot liquid turbine, the expansion in the second vapor turbine between substantially the same limits of temperature and pressure as in the second hot liquid turbine.

3. A process according to claim 1 in which expanded vapor from the vapor turbine and from the hot liquid turbine are condensed and the liquid condensate and liquid from the hot liquid turbine are pressurized and the pressurized liquid is heated by heat exchange from an energy source.

4. A process according to claim 3 in which the combined vapor is condensed in heat exchange with a second working fluid in evaporation and the second working fluid is expanded in a vapor turbine which is in parallel with a hot liquid turbine in which saturated second working fluid liquid is expanded substantially between the same limits of temperature and pressure as in the second working fluid vapor turbine.

5. A process according to claim 1 in which the energy source is geothermal water which constitutes the working fluid.

6. A process according to claim 1 in which the energy source is geothermal water and steam constituting the working fluid.

7. A process according to claim 1 in which the saturated liquid which is expanded to a two-phase mixture in a hot liquid turbine is water and in which the parallel vapor expansion is of water vapor.

8. A process according to claim 2 in which multiple working fluids are used, water being one of them, and both liquid from the lowest temperature liquid turbine and exhaust steam from the liquid turbine after passing through the vapor turbine are brought into heat exchange relation with a working fluid having a lower boiling point than water, which fluid is pressurized so that it does not boil and is expanded in at least one stage of hot liquid turbine in which the liquid and its vapor are separated and the vapor expanded in a vapor turbine.

9. A process according to claim 8 in which the lower boiling fluid is a fluoro carbon.

10. A process according to claim 8 in which a third working fluid boiling at a higher temperature than that of water is first exposed to the heat and is expanded in at least one stage of hot liquid turbine in which liquid and vaporized liquid are separated and vapor is expanded in a vapor turbine.

* * * * *